(12) United States Patent  (10) Patent No.: US 7,515,884 B2
Blech et al.  (45) Date of Patent: Apr. 7, 2009

(54) METHOD AND SYSTEM FOR SELF-CALIBRATING TRANSMIT POWER

(75) Inventors: Steven Blech, Twinsburg, OH (US); Paul Stager, Cuyahoga Falls, OH (US)

(73) Assignee: Cisco Technology, Inc.

( * ) Notice: Subject to any disclaimer, the term of this patent is extended or adjusted under 35 U.S.C. 154(b) by 713 days.

(21) Appl. No.: 11/070,716

(22) Filed: Mar. 2, 2005

(65) Prior Publication Data

US 2006/0199552 A1  Sep. 7, 2006

(51) Int. Cl.
*H04B 17/00* (2006.01)
*H04B 1/04* (2006.01)
*H03C 1/62* (2006.01)

(52) U.S. Cl. .................................. 455/127.1; 455/115.1

(58) Field of Classification Search ............... 455/127.1, 455/115.1, 69, 115.2–115.4, 126, 127.2, 455/522, 67.11–67.14, 63.1, 423, 425, 232.1–250.1
See application file for complete search history.

(56) References Cited

U.S. PATENT DOCUMENTS

| | | | | |
|---|---|---|---|---|
| 5,038,112 A | * | 8/1991 | O'Neill | 330/207 P |
| 5,452,473 A | * | 9/1995 | Weiland et al. | 455/88 |
| 5,627,857 A | * | 5/1997 | Wilson | 375/219 |
| 5,732,334 A | * | 3/1998 | Miyake | 455/126 |
| 5,960,333 A | * | 9/1999 | Repke et al. | 455/91 |
| 6,240,100 B1 | * | 5/2001 | Riordan et al. | 370/442 |
| 6,256,438 B1 | * | 7/2001 | Gimblet | 385/109 |
| 6,272,322 B1 | * | 8/2001 | Su | 455/67.14 |
| 6,374,116 B1 | * | 4/2002 | Peterzell et al. | 455/522 |
| 6,711,388 B1 | * | 3/2004 | Neitiniemi | 455/127.1 |
| 6,801,033 B2 | * | 10/2004 | Sudo et al. | 324/158.1 |
| 6,819,910 B2 | | 11/2004 | Shi et al. | |
| 6,819,938 B2 | * | 11/2004 | Sahota | 455/522 |
| 2004/0198261 A1 | | 10/2004 | Xiong | |
| 2005/0130595 A1 | * | 6/2005 | Shurvinton et al. | 455/67.11 |

OTHER PUBLICATIONS

International Search Report for International Application No. PCT/US06/07517, filed Mar. 2, 2006.

* cited by examiner

*Primary Examiner*—Pablo N Tran
(74) *Attorney, Agent, or Firm*—Tucker Ellis & West LLP

(57) ABSTRACT

A small number of transmissions are performed at a sufficient number of frequencies and power levels so that a correlation between frequency, measured power, and detector values is established. Once a correlation is established, the wireless transmitter employs the measured data and calculates target detector values for all supported frequencies and at all supported power levels, eliminating the need for one frequency and one power level at a time iterations with a host device. Using the calculated target detector values and closed loop transmissions, the radio self-calibrates. Once employed in the field, the wireless transmitter can utilize measured changes in signal strength to determine when to re-calibrate, and using measured values from other network components, can employ the methodology of the present invention to self-calibrate, eliminating the need for field re-calibrations.

20 Claims, 7 Drawing Sheets

METHOD AND SYSTEM FOR SELF-CALIBRATING TRANSMIT POWER

BACKGROUND OF THE INVENTION

The present invention relates generally to wireless transmitters and more specifically to a method and system for self-calibrating output power of a wireless transmitter.

It is often desirable that wireless transmitters, such as 802.11 capable radios used in a wireless local area network (WLAN), have calibrated transmit power levels.

Typically, calibration is performed during manufacturing. Traditional calibration methods require significant time and money, affecting both throughput on the manufacturing line and profit margins. Furthermore, radio transmit power can change over time, due to component aging, etc. These power changes can have a detrimental effect on WLANs, reducing throughput and creating a need for site maintenance, for example a new site survey, relocating or adjusting transmit power, etc. This can be particularly problematic in installations with radios in difficult to access areas, e.g., isolated location, difficult to reach locations such as a ceiling of a warehouse, etc.

Transmit power control for a typical 802.11 radio is closed loop system consisting of one or more output gain stages (with coarse and fine adjustments), and a power detector feedback circuit that outputs a value representative of the transmit power being delivered. The radio maintains a proper output power by continually monitoring the detector value during transmission, adjusting the gain stages as needed to keep the detector value equal to some desired detector "target value." As such, calibration needs to be performed on each radio, obtaining a detector target value for each frequency at each of the various transmit power levels. These values are stored in Transmit Power Calibration Tables in non-volatile memory of the radio.

Existing calibration systems use an iterative, time consuming process to determine the detector values for a given radio. A typical system consists of a host computer that controls the process, equipment for measuring transmit power, and the device under test (the radio being tested). The process for determining the proper detector values consists of the host computer commanding the radio to transmit an open loop at a specified frequency, reading the measured power from the test equipment, adjusting the gain settings on the radio and repeating until the measured power equals the desired level. The detector value is then read from the radio by the host and stored with corresponding gain settings. This process then repeats itself for all supported frequencies, at all supported power levels. The accumulated detector and gain values are then stored into the power tables. The power tables are then transferred to the radio, often using a very slow link, and then stored in the radio's non-volatile memory.

BRIEF SUMMARY OF THE INVENTION

In accordance with an aspect of the present invention, there is described herein a method where a wireless transmitter can generate Transmit Power Calibration Tables using a minimum number of measured data points, significantly reducing manufacturing time and cost. In accordance with another aspect of the present invention, the capability to generate Transmit Power Calibration Tables from a minimum number of measured data points is employed to maintain specified site mapping and network throughput.

In accordance with an aspect of the present invention, there is disclosed herein a method wherein a small number of transmissions are performed at a sufficient number of frequencies and power levels so that a correlation between frequency, measured power, and detector values is established. Once a correlation is established, the wireless transmitter employs the measured data and calculates target detector values for all supported frequencies and at all supported power levels, eliminating the need for one frequency and one power level at a time iterations with a host device. Using the calculated target detector values and closed loop transmissions, the radio self-calibrates. Once employed in the field, the wireless transmitter can utilize measured changes in signal strength to determine when to re-calibrate, and using measured values from other network components, can employ the methodology of the present invention to self-calibrate, eliminating the need for field re-calibrations. Other aspects of the present invention include computer-readable medium of instructions and a system configured to implement the method of the present invention.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Throughout this description, the preferred embodiment and examples shown should be considered as exemplars, rather than limitations, of the present invention. The present invention addresses the aforementioned shortcomings in prior art calibration techniques.

In accordance with an aspect of the present invention, a small number of open loop transmissions are performed at a sufficient number of frequencies and power levels so that a correlation between frequency, measured power, and detector values are established. Once a correlation is established, the wireless transmitter employs the measured data and calculates target detector values for all supported frequencies and at all supported power levels, eliminating the need for one frequency and one power level at a time iterations with a host device.

In accordance with an aspect of the present invention, the wireless transmitter records all pertinent calibration data internally. This can include power measurements that were made externally and communicated to the wireless transmitter by a wired or wireless interface.

In accordance with an aspect of the present invention, the wireless transmitter performs closed loop transmits on each supported frequency, at each supported power level using the aforementioned calculated target detector values to determine proper gain stage starting values for each frequency/power level combination.

In accordance with an aspect of the present invention, the wireless transmitter generates the respective power tables from data recorded within the wireless transmitter and stores the power tables in non-volatile memory, thus minimizing host device processing time for this task. Furthermore, because the wireless transmitter is performing the calculations and not the host device, this minimizes the often non-trivial data transfer delays from the host device to the wireless transmitter.

In accordance with an aspect of the present invention, the self calibration capabilities are utilized for field re-calibration of transmit power. For example, a WLAN with a Radio Manager device and access points equipped with self calibrating transmitters enables the Radio Manager to maintain the WLAN without the wireless transmitters being physically removed from the network. The Radio Manager compiles statistics on measured signal strengths of the various wireless transmitters under its management. This enables the Radio Manager to determine when the signal strength of a particular radio has changed over time. Once it is determined that the signal strength has changed, the Radio Manager can forward signal strength data to the wireless transmitter in question. Using the measured indication of transmit power received from the Radio Manager, the radio is enabled to re-calibrate its output power stages utilizing the method described herein.

Figure 1:
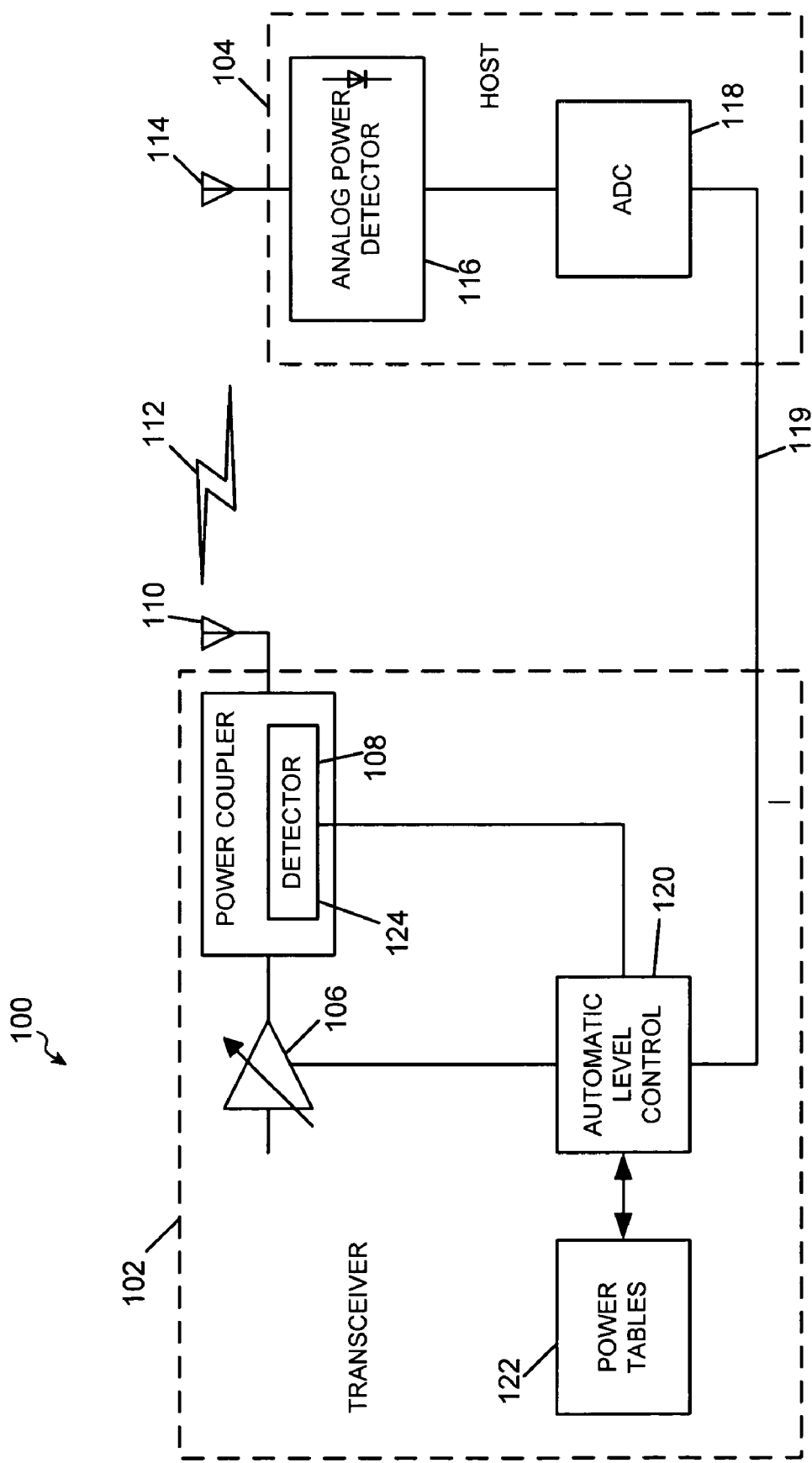
FIG. 1 is a block diagram of a system in accordance with an aspect of the present invention.

FIG. 1 is a block diagram of a system 100 in accordance with an aspect of the present invention. System 100 comprises a wireless transmitter 102, the device under test, and a host 104. As will be described in more detail here infra, wireless transmitter 102 sends a wireless signal 112 that is received by host 104, which measures the power of wireless signal 112. Host 104 communicates with wireless transmitter 102 along path 119. Host 104 is suitably adapted to inform wireless transmitter 102 via path 119 to increase or decrease its gain until the measured output power is at a desired level. The desired level can be equal to the desired signal strength or within a range of the desired signal strength, e.g. 5%, 10-20%, or within a certain dB range such as 3 dB.

Transmitter 102 has an adjustable gain amplifier 106. Although, as described herein the method of the present invention adjusts an adjustable amplifier 106, this is done merely for simplicity of illustration as any adjustable component that affects the output transmit power of transmitter 102, including multiple amplifier stages, can be adjusted. A signal from transmitter 106 passes through power coupler 108. Power coupler 108 comprises a power detector 124. Power detector obtains a power detector value of the output of power amplifier 106 indicative of the power of the signal being transmitted. In a preferred embodiment, power detector 108 further comprises an ADC (Detector ADC) that provides a digital representation of the signal measured by detector 108. After passing through power coupler 108, the signal is then transmitted via antenna 110, which as shown is wireless signal 112.

Wireless signal 112 is received by antenna 114 coupled to host 104. The signal is then provided to analog power detector 116. Analog power detector 116 measures the signal power and sends the measurement to Analog to Digital Converter (ADC) 118, which produces a digital representation of the measured signal. If wireless signal 112 is not at a desired power level, host 104 sends a signal via path 119 to transmitter 102. Path 119 is any wired or wireless, or combination of wired and wireless mediums suitable for transmitting signals between transmitter 102 and host 104.

Automatic Level Control (ALC) 120 adjusts the gain of amplifier 106 based on the feedback received from host 104 via path 119. In accordance with an aspect of the present invention, transmitter power calibration is utilized to adjust for process variations in the power coupler 108, detector 108 and amplifier 106 circuit responses. A goal of the calibration process is to determine the values for detector 108 as a function of output power and channel frequency. Accurate calibration results can be obtained using a subset of the power steps and channel frequencies with an appropriate interpolation procedure to determine the entire response.

The results of the calibration process are stored in power tables 122. In a preferred embodiment, power calibration tables 122 contain the following information for each operating point (typically an operating point is a frequency and power level):

ALC 120 set point—Detector ADC value for the required output power.

ALC 120 Lo Delta—Number of Detector ADC counts below ALC set point to set the lower power correction window limit.

ALC 120 High Delta—Number of Detector ADC counts below ALC set point to set the upper power correction window limit.

IF Gain—IF gain setting.

Gain Select—RF coarse gain select bit for amplifier 106.

OFDM RF Trim—Starting RF trim value for OFDM signals.

OFDM PHY TX Gain—PHY gain setting for OFDM signals.

CCK RF Trim—Starting RF trim value for CCK signals.

CCK TX Gain—PHY gain setting for CCK signals.

In accordance with an aspect of the present invention power calibration is enhanced by using a smaller subset of the power-frequency domain, and requiring a less stringent proximity of the measured power to the target power. An exemplary calibration procedure uses 9 data points to complete the power table containing 672 points (28 channel frequencies×8 power steps×3 window points) for a 5GHz channel set. The values of detector 108 are expressed in dB, e.g., 20* log (Detector ADC), versus the output power are closely approximated by a straight line (see FIG. 2). Although this implies a linear interpolation may be sufficient, use of a second degree polynomial in the interpolation procedure usually improves the low power accuracy. Alternatively, a second degree polynomial can be used to accurately interpolate the Detector ADC values versus frequency for each power step. As a more general rule, the degree of the polynomial would be (n−1), where n is the number of frequency points or the number of power points. For example, for a 15-point calibration for a 5 GHz radio, using 5 frequencies and 3 power levels, the polynomial would be a degree of 4.

For example, the polynomial can be generated by Newton's interpolation method (a detailed description of Newton's interpolation method can be found in the text: "Introduction to Numerical Analysis", J. Stoer and R. Bulirsch, pp. 43-49, Springer Publishing, Texts in Applied Mathematics Series, hereby incorporated by reference). This method generates an n-degree polynomial, P(x), from the support points $(x_i, y_i)$, i=1,2, . . . , n+1 such that $P(x_i) = y_i$. The polynomial is expressed in the form:

$$P(x) = a_1 + a_2 \cdot (x-x_1) + a_3 \cdot (x-x_1) \cdot (x-x_2) + \ldots + a_{n+1} \cdot (x-x_1) \ldots (x-x_n)$$

The coefficients $a_i$ are found by a simple algorithm. An example fortran program is given below:

```
       SUBROUTINE newtondd_coeff(x,y,a,n)
              implicit none
              integer n,i,j
              double precision y(100),x(100),a(100),t(100)
              i=1
                  t(i)=y(i)
                  a(i)=t(1)
              i=2
                  t(i)=y(i)
                  j=i-1
                      t(j)=(t(j+1)-t(j))/(x(i)-x(j))
                  a(i)=t(1)
              do 30 i=3,n+1
                  t(i)=y(i)
                  do 40 j=i-1,1,-1
                      t(j)=(t(j+1)-t(j))/(x(i)-x(j))
40                continue
                  a(i)=t(1)
30         continue
           return
           end
```

The interpolating polynomial, P(z), can be evaluated for any argument, z, with the fortran routine:

```
       SUBROUTINE newtondd_interp(P,z,a,x,n)
              implicit none
              integer i,n,j
              double precision ff(100),z,a(100),x(100),f
              ff(n+1)=a(n+1)
              do 10 i=n,1,-1
                  ff(i)=ff(i+1)*(z-x(i))+a(i)
10         continue
              P=ff(1)
              return
              end
```

Using the nominal IF and RF gain settings for each power step, and the RF trim adjustment algorithm to measure the 9 calibration data points. To ensure a robust procedure the RF trim adjustment algorithm adjusts the RF trim to find values close to the desired calibration data point. In a preferred embodiment, the data point can be as much as 3 dB away from the power target. The interpolation method does not require an exact match.

Figure 2:
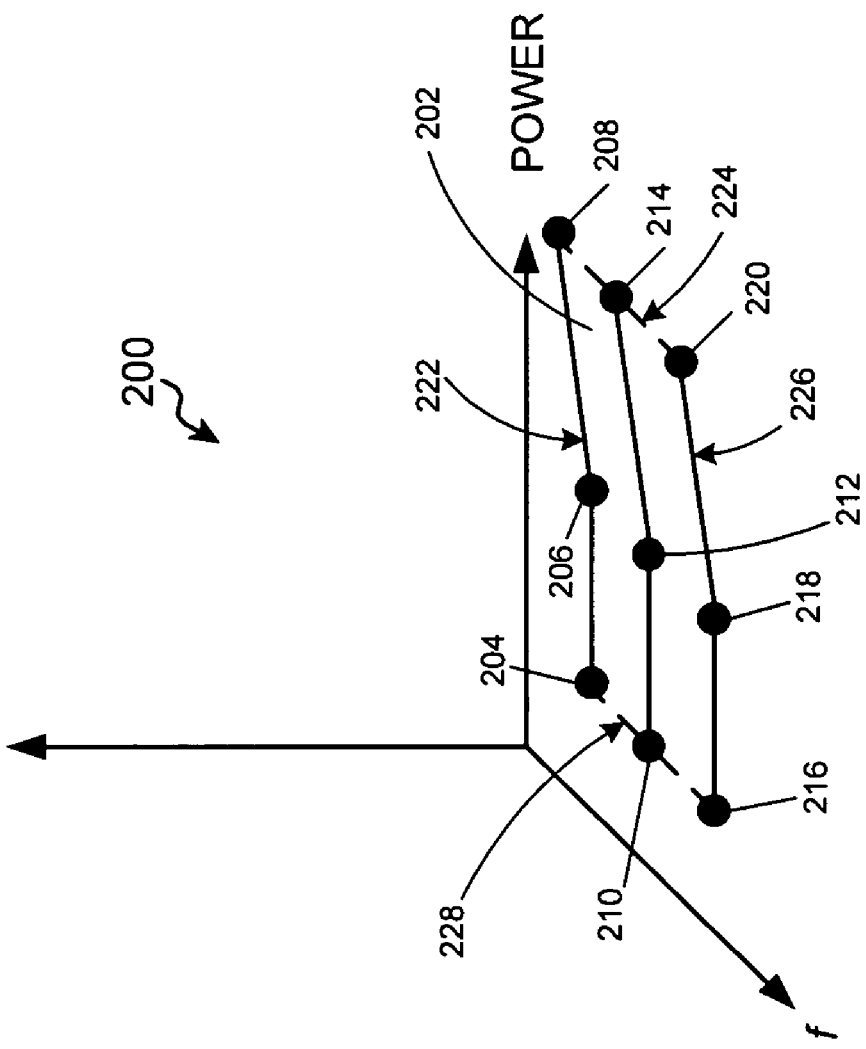
FIG. 2 is a graphical diagram of exemplary power detector measurements used for interpolating remaining power detector values in accordance with an aspect of the present invention.

Referring to FIG. 2 with continued reference to FIG. 1, there is illustrated a graphical diagram 200 of exemplary measurements of detector 108 measurements used for interpolating remaining desired power detector values in accordance with an aspect of the present invention. The graph has 3 axes, Power, Detected Power and Frequency. In a preferred embodiment, three frequencies (although any number of frequencies sufficient to provide enough data points for interpolation can be selected), preferably, the lowest operating frequency, the highest operating frequency and an intermediate operating frequency are selected, as are three power levels (although any number of power levels sufficient to provide enough data points for interpolation can be selected) for each frequency, preferably the lowest, highest and a medium power range. The measured detector 108 values are plotted, which correspond to points 204, 206, 208, 210, 212, 214, 216, 218 and 220. Using lines 222, 224, 226 and 228 to connect the outer points, 204, 206, 208, 214, 220, 218, 216 and 210, a closed plane 202 is formed.

In accordance with an aspect of the present invention, once points 204, 206, 208, 210, 212, 214, 216, 218 and 220 are determined, the detector values for the remaining operating points are interpolated based on points 204, 206, 208, 210, 212, 214, 216, 218 and 220. Referring again to FIG. 1, ALC 120 sets a frequency and gain for amplifier 106. A wireless signal 112 is transmitted using the settings set by ALC 120 and measured by analog power detector 116 of host 104. The gain is adjusted until wireless signal is at a desired power level as measured by analog power detector 116 of host 104. Once the desired power level is attained, host 104 obtains from transceiver 102 the gain settings and the detector value from detector 108. Host 104 then records the frequency, power level, gain, detector value. This procedure is repeated until the nine operating points, wherein each operating point corresponds to a frequency and power level, are plotted.

Because the detector values and the measured power levels are known, a correlation between the detector values and output power is established. Once the correlation between detector values and output power is established in accordance with an aspect of the present invention, the detector values for the remaining operating points can be calculated by interpolation, using a plot such as is shown in FIG. 2.

In one embodiment, the interpolation is performed by logic within host 104. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. Once the interpolation is completed, the desired detector values are sent to transmitter 102 via path 119.

In another embodiment, the data for the measured operating points is sent to transmitter 102 and the interpolation of the remaining operating points is performed by logic within transmitter 102. A benefit of this embodiment is because path 119 may be a slow interface, transmitting the data before interpolation minimizes the amount of data transferred between host 104 and transmitter 102.

After the desired detector values are computed, transmitter 102 is now able to determine the appropriate gain settings for each operating point. The gain for amplifier 106 is set, and closed loop transmissions are made which are detected by detector 124. ALC 120 obtains the measured detector value and the gain is adjusted by ALC 120 until the measured detector value is at a desired level. The desired level can be equal to the desired detector value or within a range of the desired detector value, e.g. 5%, 10-20%, or within a certain dB range such as 3 dB. A benefit of the gain settings being determined by transmitter 102 is that it minimizes the amount of data required to be sent across path 119 from host 104.

Upon completion of the calibration procedure, power tables 122 are updated with the frequency, power level, gain, detector value and any other parameter for attaining the target signal levels. The values stored in power tables 122 are used for the operation of transmitter 102. For example, when a signal is to be transmitted by transmitter 102, ALC 120 obtains the appropriate gain and any other parameters from power tables 122 and sets amplifier 106 accordingly. Once amplifier 106 has been set, the signal is amplified by amplifier 106 and sent via antenna 110.

Figure 3:
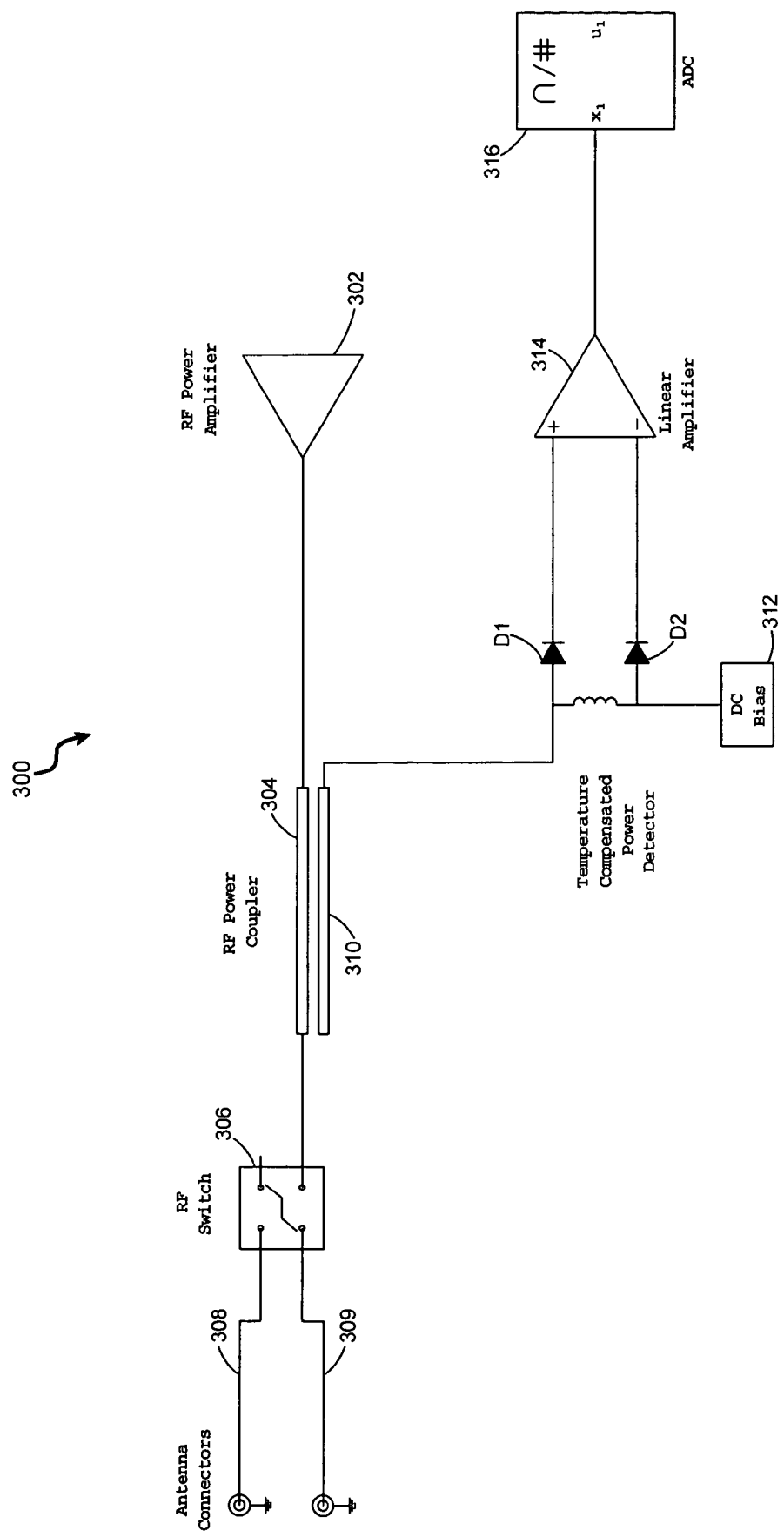
FIG. 3 is a schematic diagram of a transmitter in accordance with an aspect of the present invention.

Referring now to FIG. 3, there is illustrated a schematic diagram of a transmitter 300 suitably configured to implement an aspect of the present invention. Power amplifier 302 transmits a signal that passes through RF power coupler 304, 310. After passing through power coupler 304, 310, the signal passes through switch 306 which routes the signal to one of antennas 308, 309. RF power coupler 304, 310 is preferably a directional coupler that transfers a small amount of energy is from 304 to 310. In a preferred embodiment, the coupled energy is at least 15 dB below the RF signal level at the output of power amplifier 302. The RF voltage across nonlinear detector diode D1 produces a DC current in relation to the RF power.

Changes in temperature move the DC operating point of detector diode D1. By measuring the operating point of a matched diode, the temperature compensation diode D2, the DC operating point variations can be subtracted from the measured voltage. The result is a voltage which is only proportional to the RF signal power. Diodes D1 and D2 are biased by DC bias 312.

The output level of the power detector is generally low. Therefore, an op-amp circuit 314 is used to amplify the signal to the full input range of ADC 316. This results in maximum resolution of the detected voltage.

ADC 316 samples the detected DC voltage at the output of linear amplifier 314. In a preferred embodiment ADC 316 is used in one shot mode, ADC 316 latches the output of linear amplifier 314.

In accordance with an aspect of the present invention, the output of ADC 316 is correlated to power measurements measured by an external power meter (see for example host 104 in FIG. 1). In accordance with another aspect of the present invention, once the correlation between the external power meter and the output of ADC 316 is established, then desired values for the output of ADC 316 can be interpolated for all operating points (e.g., every frequency and power level for the transmitter). Transmitter 300 can then self-calibrate itself by transmitting closed loop signals and adjusting the gain of RF power amplifier 302 until the output of ADC 316 reaches a desired value.

Figure 4:
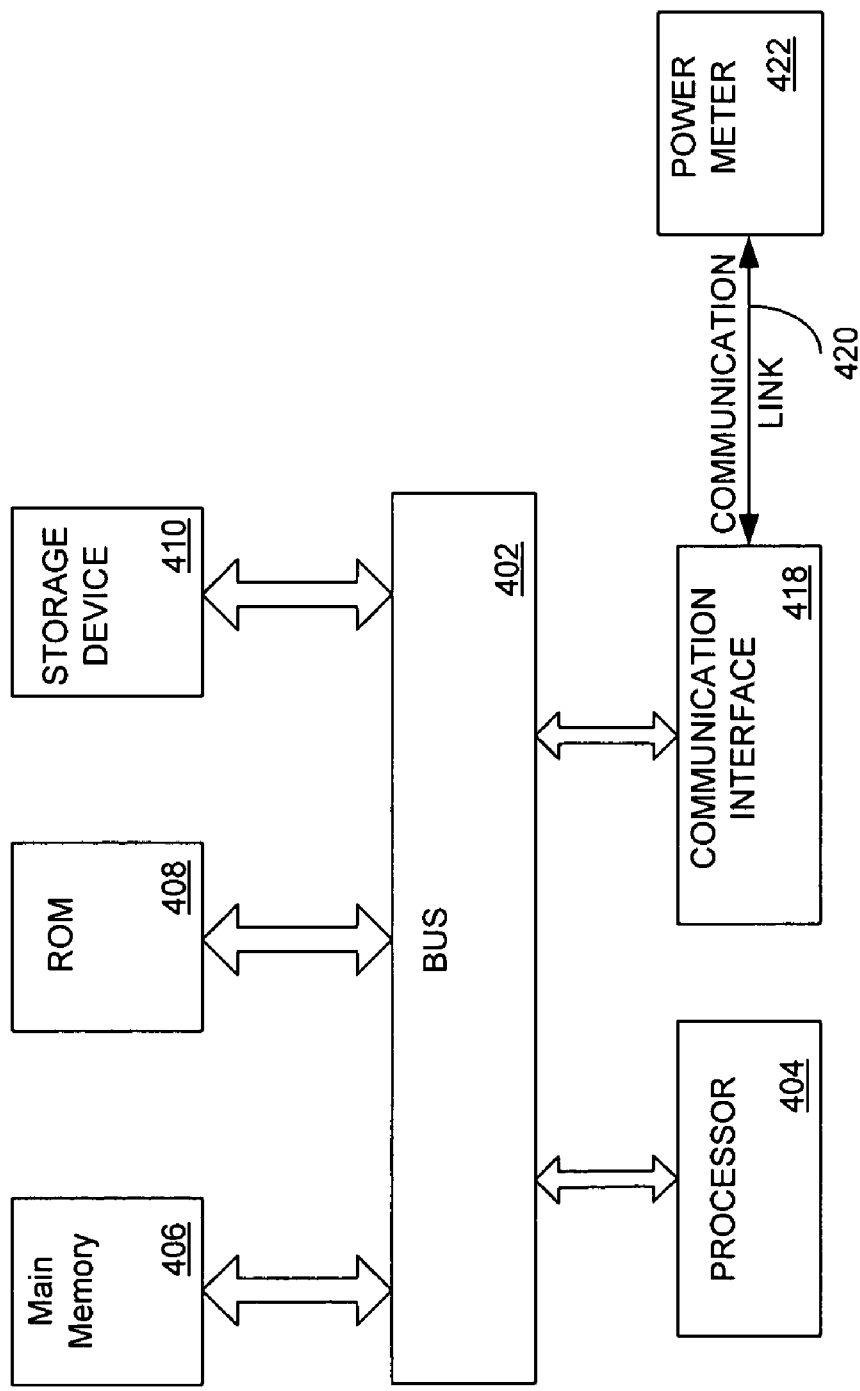
FIG. 4 is a block diagram of a computer system for implementing an aspect of the present invention.

FIG. 4 is a block diagram that illustrates a computer system 400 upon which an embodiment of the invention may be implemented. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a ready only memory (ROM) 408 or other static storage device coupled to bus 402 for storing static information and instructions for processor 404. A storage device 410, such as a magnetic disk or optical disk, is provided and coupled to bus 402 for storing information and instructions.

The invention is related to the use of computer system 400 for self-calibrating a wireless transceiver. According to one embodiment of the invention, self-calibrating a wireless transceiver is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a communication link 420 that is connected to a Power Meter 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

In accordance with an aspect of the present invention, communication interface 418 receives external measured power readings from power meter 422 via communication link 420. This enables processor 404 to execute instructions to calibrate an internal power detector, for example the ADC 318 readings of a power detector as shown in FIG. 3. Communication interface 418 can also be used to send settings such as gain and internal power detector readings to power meter 422 across communications link 420. In one embodiment, interpolated desired output values for the internal detector can be calculated by power meter 422 and sent via communication link 420 to communication interface 418 which forwards them across bus 402 to storage device 410. In another embodiment, processor 404 interpolates the desired internal detector values using measured readings from power meter 422.

In accordance with an aspect of the present invention, when the wireless transceiver with computer system 400 is installed in the field, communication link 420 is employed to communicate with other devices on the network, such as other access points, wireless switches, etc. that provide computer system 400 with readings indicative of the output transmit power of the wireless transceiver, as will be described herein. Using the readings provided from the other network components enables processor 404 to execute instructions for re-calibrating the wireless transceiver in the field, without the need for on site servicing by maintenance personnel. Readings indicative of transmit power can be measured power and/or signal strength, such as RSSI.

Figure 5:
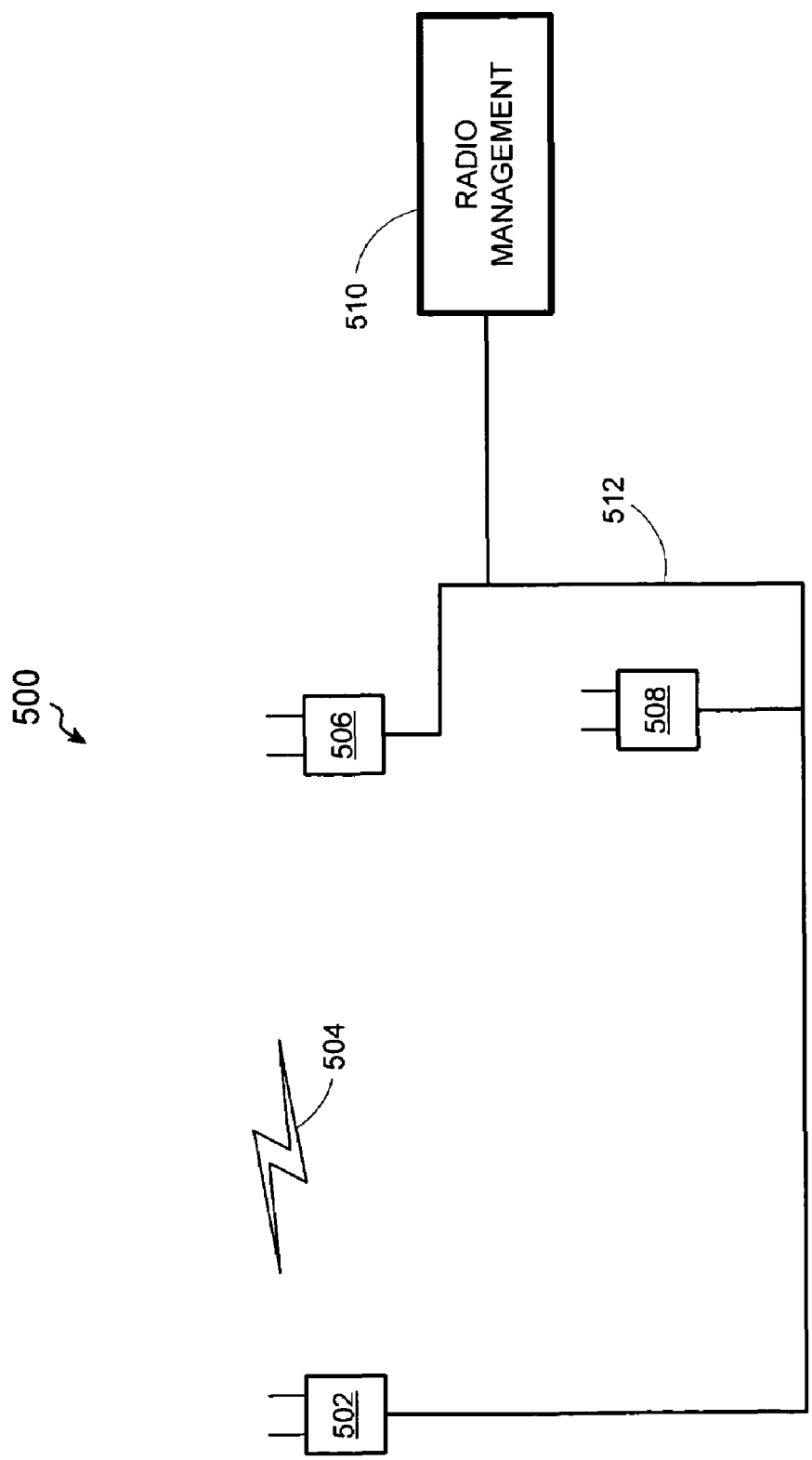
FIG. 5 is a diagram of a wireless local area network configured to implement an aspect of the present invention.

FIG. 5 is a diagram of a wireless local area network 500 configured to implement an aspect of the present invention. The network comprises access points 502, 504 and 508 and a radio management module 510. Access points 502, 506, 508 and radio management module 510 are coupled by a backbone network 512. Access points 502, 504, 508 comprise logic for controlling their operation. Radio management modeul 510 comprises logic for determining and providing operating parameters, such as operating frequencies and power levels, to access points 502, 504, 508. Radio management modeul 510 may be embodied in logic in one or more network components, such as an authentication server, wireless switch router, or even contained within one of access points 502, 504, 508, coupled to backbone network 512. Backbone network 512 is one or more of any suitable wired, wireless or combination of wired and wireless network topologies.

In accordance with an aspect of the present invention, access point 502 sends a wireless signal 504. The destination of the wireless signal is not important, as it may be destined for one or more clients (not shown) associated with access point 502 and/or to either access point 506 and/or access point 508. However, as one or more of access points 506 and 508 are within range of access point 502, they can observe and measure the properties of signal 504, such as power, signal strength, RSSI, etc. The measurements of signal 504 are sent to radio management module 510. As transmitter output power often degrade over time, radio management modeul 510 compares the currently measured signal properties of access point 502 with stored measurements of signal properties for access point 502. If the current measurements vary from the stored measurements by a predetermined threshold, e.g., 20% or 3 dB, then radio management modeul 510 sends a message across network backbone 512 to access point 502 to re-calibrate.

In one embodiment, radio management modeul 510 sends the current measurements to access point 502. In another embodiment, access point 502 obtains the current measurements from access point 506 and/or access point 508 across network backbone 512.

Accordingly, access point 502 then utilizes the current measurements to calculate new desired power detector values as described herein. After calculating the new desired power detector values, access point can then complete the re-calibration by performing closed loop tests, adjusting gain and any other parameters to determine new operating parameters for each operating point. Once the self-calibration is complete, the new operating parameters are stored in access point 502's power tables.

In accordance with an aspect of the present invention, radio management modeul 510 can also schedule re-calibrations for access point 502. For example, in areas exposed to light & other environmental conditions, conditions during the daytime can differ from nighttime conditions. Accordingly, radio management modeul 510 can schedule one re-calibration during the day and one during the night, and if desired can store the operating parameters for access point 502, and subsequently send the appropriate parameters to access point 502 during the day and during the evening. However, as climate may also change, in another embodiment it is also contemplated that access point 502 can re-calibrate daily.

An aspect of the present invention is that access point 502 can re-calibrate as often as necessary without requiring any intervention by field personnel. This can reduce maintenance and operating costs of access point 502. In addition, access point 506 and/or access point 508 can also be equipped with logic for performing the calibration methodologies described herein, reducing the need for field personnel to service them.

Figure 6:
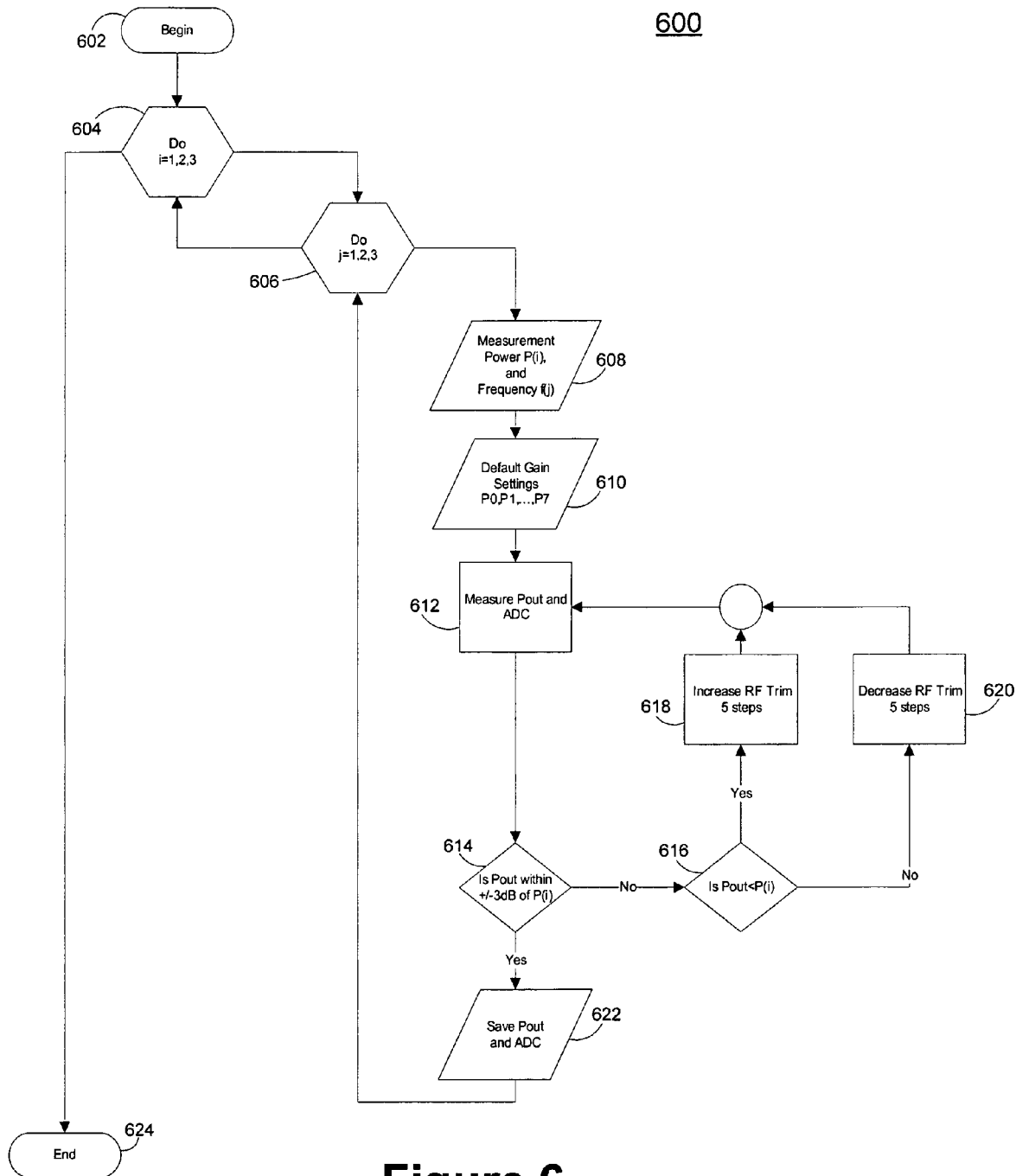
FIG. 6 is a block diagram of a methodology to determine operating point parameters in accordance with an aspect of the present invention.
Figure 7:
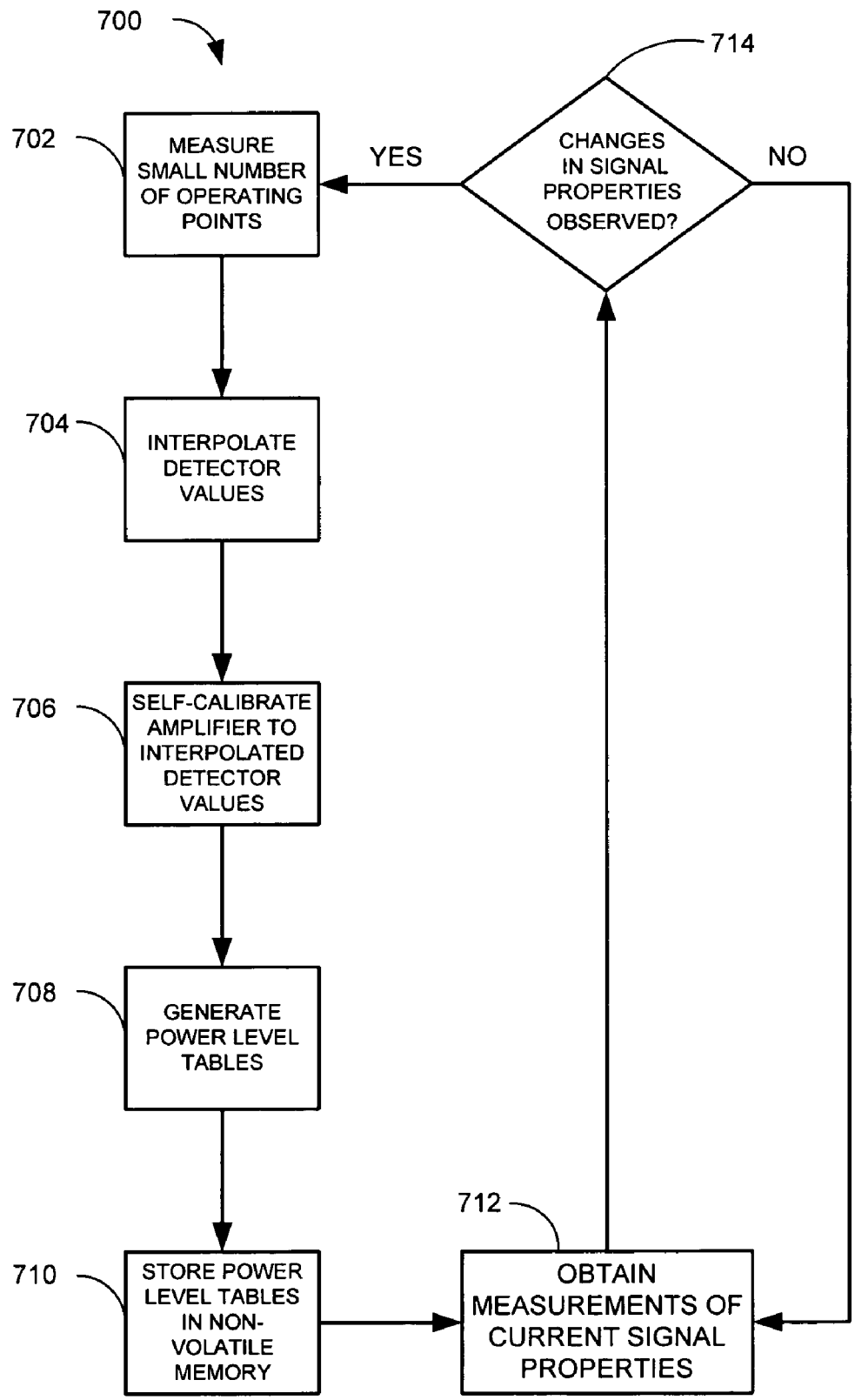
FIG. 7 is a block diagram of a methodology for self-calibrating a transmitter in accordance with an aspect of the present invention.

In view of the foregoing structural and functional features described above, a methodology in accordance with various aspects of the present invention will be better appreciated with reference to FIGS. 6-7. While, for purposes of simplicity of explanation, the methodology of FIGS. 6-7 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 6 is a block diagram of a methodology 600 to determine operating point parameters for a wireless transmitter in accordance with an aspect of the present invention. The methodology 600 can be implemented using a system 100 as described in FIG. 1 for initial calibration of a wireless transmitter and/or implemented using a system 500 as described in FIG. 5.

Methodology 600 begins at 602. At 604 a counter is initialized to one (i=1) and a set of operating conditions (e.g., test frequencies) are selected. In a preferred embodiment, three values (i=1,2,3) correspond to the lowest, a mid-range and the highest operating frequencies of the wireless transmitter. The first time step 604 is executed, the wireless transceiver tests the first frequency, the second time step 604 is executed the wireless transceiver tests the second frequency and the third time step 604 is executed the wireless transceiver tests the third frequency. The fourth time step 604 is executed, the process stops as shown at 624.

At 606 another counter is initialized to one j=1) and a set of operating conditions (e.g., test power levels) are selected. In a preferred embodiment, three values j=1,2,3) correspond to the lowest, a mid-range and the highest operating power levels of the wireless transmitter. The first time step 606 is executed, the wireless transceiver tests the first power level, the second time step 606 is executed the wireless transceiver tests the second power level and the third time step 606 is executed the wireless transceiver tests the third power level. The fourth time step 606 is executed, the process returns to step 604. As illustrated, the combination of steps 604 and 606 can generate nine data points as shown in FIG. 2.

At 608, Power P(i) and frequency P(j) for the current operating point (i,j) of the wireless transceiver are measured. The measurements can be made by a host device 104 as shown in FIG. 1 or by another network component such as an access point 502, 506, 510 as shown in FIG. 5. In alternate embodiments, instead of measuring power, other properties such as signal strength, RSSI, etc. of the signal sent from the wireless transceiver can be measured.

At 610, the power amplifier of the wireless transmitter is set to its default gain setting. Ordinarily, the gain setting for each power level P(i) is different. At 612, the wireless transmitter sends a signal which is measured. Pout is measured by an external power measurement device, such as host 104 (FIG. 1) or another access point 502, 506, 510 (FIG. 5). At the same time, a measurement is obtained from the power detector (ADC), such as from ADC 316 (FIG. 3).

At 614, the measured Pout is compared to the desired output power P(i). As illustrated, the comparison determines if Pout is within +/−3 dB of P(i). However, any suitable comparison method is acceptable.

If at 614, the measured power Pout is within 3 dB of P(i) (YES), then processing continues to 622 where Pout and the power detector (ADC) readings are saved. Then at 606, j is incremented, that is j=j+1 to test the next frequency. If j after being incremented is greater than 3, processing continues to 604, where the next power level (i=i+1) is processed, starting at the first frequency (j=1), unless I after being incremented is greater than 3. If at 606 j>3 and at 604 i>3, then at 624 the procedure ends. Otherwise, after at 606 j has been incremented, or after at 604 i has been incremented and at 606 j is set equal to one, processing returns to step 608 for the next set of measurements, such as power P(i) and frequency f(i).

If at 614, the measured output power Pout is not within 3 dB of P(i) (NO), then processing continues to step 616. At 616, it is determined if Pout<P(i). If at 616, Pout is less than P(i) (YES), then at 618 the RF Trim is increased by 5 steps. If at 616, Pout is greater than P(i) (NO), then at 620 RF trim is decreased by 5 steps. After completion of step 618 or step 620, processing returns to 612, where a signal is transmitted with the new RF trim value and Pout and the power detector (ADC) are measured. Steps 612 and 614 (and when appropriate steps 616, 618 and 620) are repeated until Pout is within 3 dB of P(i).

At the conclusion of methodology 600, nine operating points have been calculated, and the corresponding gain, power measurement and power detector (ADC) have been observed. At this point, a correlation between the power measurements and the power detector (ADC) readings can be made and power detector values for the remaining operating points can be interpolated based on the observed readings. For example, the remaining operating points can be interpolated by plotting the observed points as shown in FIG. 2.

It should be noted that although the preceding example used 9 points, this was merely for illustrative purposes and any number of suitable points are acceptable. Likewise, although the preceding example illustrated the RF trim adjustments made in increments of 5 steps, this is merely illustrative as any number of steps is acceptable. Also, although steps 616, 618 and 620 repeated until Pout is within 3 dB of P(i), this is merely illustrative as any acceptable range for Pout can be employed.

FIG. 7 is a block diagram of a methodology 700 for self-calibrating a wireless transmitter in accordance with an aspect of the present invention. At 702, a small is number of operating points are measured. The operating points can be measured using the technique, or a similar technique to the methodology 600 illustrated in FIG. 6. During step 702, a small number of operating points, typically frequency and power levels, are measured using an external measurement, such as a power meter or other means for measuring signal strength (e.g., RSSI), and using an internal measuring device such as a power detector coupled to output of the transmitter power amplifier. A sufficient number of operating points are selected to enable the internal measurements to be correlated with the external measurements. Typically, the correlation is performed by an external device coupled to the external measuring device such as host 104 (FIG. 1) or radio management modeul 510 (FIG. 5).

In accordance with an aspect of the present invention power calibration is enhanced by using a smaller subset of the power-frequency domain, and requiring a less stringent proximity of the measured power to the target power. An exemplary calibration procedure uses 9 data points to complete the power table containing 672 points (28 channel frequencies×8 power steps×3 window points) for a 5 GHz channel set. The detector values expressed in dB, 20* log(Detector ADC), versus the output power are closely approximated by a straight line (see FIG. 2). Although this implies a linear interpolation may be sufficient, use of a second degree polynomial in the interpolation procedure usually improves the low power accuracy. A second degree polynomial is also used to accurately interpolate the Detector ADC values versus frequency for each power step.

Using the nominal IF and RF gain settings for each power step, and the RF trim adjustment algorithm to measure the 9 calibration data points. To ensure a robust procedure the RF trim adjustment algorithm adjusts the RF trim to find values close to the desired calibration data point. The data point can be as much as 3 dB away from the power target. The interpolation method does not require an exact match.

Because the detector values and the measured power levels are known, a correlation between the detector values and output power is established. Once the correlation between detector values and output power is established in accordance with an aspect of the present invention, the detector values for the remaining operating points can be calculated by interpolation, using a plot such as is shown in FIG. 2. At 704, the desired detector values for the remaining operating points are interpolated using the measurements obtained in step 702. In a preferred embodiment, the measured operating points are plotted as shown in FIG. 2, and the interpolated desired power detector values are interpolated from the plot. For example in FIG. 2, the detector ADC values are expressed in dB, 20* log(Detector ADC), versus the output power, which are closely approximated by a straight line (see FIG. 2). After the desired detector values are computed, the wireless transmitter is now able to determine the appropriate gain settings for each operating point.

In one embodiment, the wireless transmitter receives the data from the external power measurement device and performs the interpolations. A benefit of this embodiment is that it minimizes the amount of data exchanged between the external device and the wireless transmitter because the interpolated values are calculated internally by the wireless transmitter. In an alternate embodiment, the interpolations are performed by the device external to the wireless transmitter, and subsequently sent to the wireless transmitter.

At 706, the wireless transmitter self-calibrates itself. The wireless transmitter self-calibrates by performing closed loop transmissions which are measured by the transmitter's internal power detector. The power amplifier gain is adjusted until the measured power made by the transmitter's internal power detector reaches a desired value, for example within 3 dB of the desired detector value. In a preferred embodiment, step 706 performs the power calculations for each frequency and lo power level setting supported by the wireless transmitter. The gain and any other parameter that is varied to obtained the desired output is then stored.

At 708, power level tables using the gain, measured power detector level and any other parameter that was varied to obtain the desired output are generated. The power level tables are used by the wireless transmitter in operation to set power amplifier gain and other parameters for its current operating point (frequency and power level). At 710, the power level tables are stored in non-volatile memory. This enables the power level tables to be retrieved, even if the wireless transmitter loses power or is otherwise reset.

Once steps 702, 704, 706, 708 and 710 have been completed, the wireless transmitter is ready to be used. At this point, the wireless transmitter can be installed in the field and commence operating.

In accordance with an aspect of the present invention, at 712 measurements of the current signal properties are obtained by a device external to the wireless transceiver. For example, using the wireless network illustrated in FIG. 5, the signal properties can be observed by other network nodes such as access points 502, 504 and 506 which can be forwarded to a radio management module 510.

In accordance with an aspect of the present invention, at 714 it is determined if the measurements obtained at 712 are indicative of a change in signal properties. Changes in signal properties can occur due to many factors. For example, as wireless transceivers age, the output power tends to weaken. Also, environmental changes, such as temperature can affect the wireless transmitter's operation. If it is determined at 714 that there were no changes, or otherwise insignificant changes to the signal properties (NO), then monitoring of the signals continues at 712.

In accordance with an aspect of the present invention, if at 714 it is determined that the observed signal properties have changed (YES), the wireless transmitter is re-calibrated. In one embodiment, at step 702 a device external to the wireless transmitter (for example another access point on a WLAN) can obtain new power signal measures for the small number of operating points. In an alternate embodiment, the measurements of the signals performed at step 712 can be used, allowing step 702 to be skipped. At 704 new detector values are interpolated. At 706, the wireless transmitter is self-calibrated using the new interpolated detector values. At 708, power tables are generated using the data obtained from performing the self-calibration at 706 using the new interpolated detector values, which are then stored, at 710, in non-volatile memory.

An aspect of the present invention is that the wireless transmitter can re-calibrate as often as necessary without requiring any intervention by field personnel. This can reduce maintenance and operating costs of a wireless transmitter.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method for performing self-calibration of a transmitter, the method comprising:
    transmitting a first wireless signal at a first power level;
    measuring signal power of the first wireless signal at an output of a power amplifier with an internal power detector;
    receiving data representative of signal power of the first wireless signal measured from a device receiving the first wireless signal;
    correlating, as a first correlated power detector measurement, the internal power detector measurement of the first wireless signal with the data representative of the signal power of the first wireless signal measured from the device receiving the first wireless signal;
    transmitting a second wireless signal at a second power level;
    measuring signal power of the second wireless signal at the output of the power amplifier with the internal power detector;
    receiving data representative of signal power of the second wireless signal measured from a device receiving the second wireless signal;
    correlating, as a second correlated power detector measurement, the internal power detector measurement of the second wireless signal with the data representative of the signal power of the second wireless signal measured from the device receiving the second wireless signal; and
    interpolating a desired power detector value for at least one operating point based on the first and second correlated power detector measurements, wherein the at least one operating point includes a frequency and a desired output power.

2. A method according to claim 1, further comprising determining transmitter gain for achieving the desired power detector value by performing a closed loop transmission.

3. A method according to claim 2, determining the gain further comprising:
    setting transmitter gain;
    measuring the power detector value of a closed loop signal with a power coupler; and
    adjusting transmitter gain until the measured power detector value is at the desired power detector value.

4. A method according to claim 3, further comprising recording frequency, power level, transmitter gain and measured power detector value at the desired power detector value.

5. A method according to claim 3, further comprising sending the gain and power detector value to a host device coupled to the transmitter.

6. A method according to claim 1, wherein the interpolating step is performed at one of the group consisting of the transmitter and a host device coupled to receive the external power measurements.

7. A method according to claim 1, further comprising:
adjusting transmitter gain until the data representative of signal power indicates a desired output power level; and
recording frequency, power level, gain and power detector value at the desired output power level.

8. A method according to claim 1, further comprising:
receiving an external measurement from a second external source indicative of the transmitter's current operating condition; and
correlating a predetermined set of internal power detector values with corresponding external measurement from the second external source;
interpolating a power detector value for at least one operating point based on the set of internal power detector values, the operating point comprising a frequency and a desired output power; and
determining transmitter gain for achieving the desired power detector value by performing a closed loop transmission.

9. A method according to claim 8, wherein the external measurement from the second external source indicative of the transmitter's current operating condition is one of the group consisting of measured output power and received signal strength.

10. A method according to claim 1, further comprising:
the interpolating a desired power detector value further comprises interpolating a desired power detector value for each supported frequency and each supported power level of the transmitter.

11. A method according to claim 10, further comprising:
setting transmitter gain;
measuring the power detector value of a closed loop signal with a power detector; and
adjusting transmitter gain until the measured power detector value is at the desired power detector value;
wherein the setting transmitter gain, measuring the power detector value and adjusting transmitter gain is repeated for each frequency and power level supported by the transmitter that an interpolated desired power detector value was calculated.

12. A method of claim 11, further comprising:
recording the frequency, power level, gain and one of the desired power detector level and the external power measurement for each supported frequency and power level of the transmitter; and
generating power level tables based on the recorded frequency, power level, gain and one of the desired power detector level and the external power measurement; and
storing the generated power level tables in a non-volatile memory accessible to the transmitter.

13. A system for performing self-calibration of a transmitter, the system comprising:
means for transmitting a first wireless signal at a first power level;
means for measuring signal power of the first wireless signal as a first internal signal power measurement at an output of a power amplifier;
means for receiving data representative of signal power of the first wireless signal measured from a device receiving the first wireless signal;
means for correlating, as a first correlated signal power measurement, the first internal signal power measurement of the first wireless signal with the data representative of signal power of the first wireless signal measured from the device receiving the first wireless signal;
means for transmitting a second wireless signal at a second power level;
means for measuring signal power of the second wireless signal as a second signal power measurement at the output of the power amplifier;
means for receiving data representative of signal power of the second wireless signal measured from a device receiving the second wireless signal;
means for correlating, as a second correlated signal power measurement, the first internal signal power measurement of the second wireless signal with the data representative of signal power of the second wireless signal measured from the device receiving the second wireless signal; and,
means for interpolating a desired power detector value for at least one operating point based on the first and second correlated signal power measurements made at the output of the power amplifier, the operating point comprising a frequency and a desired output power.

14. A system according to claim 13, the means for interpolating further comprising:
means for determining transmitter gain to achieve the desired power detector value, the means for determining transmitter gain further comprising:
means for setting transmitter gain;
means for measuring the power a closed loop signal at the output of the power amplifier; and
means for adjusting transmitter gain until the measured power at the output of the power amplifier is at the desired power detector value.

15. A system according to claim 13, further comprising:
means for receiving data representative of an external measurement from a second external source indicative of the transmitter's current operating condition;
wherein the means for correlating is responsive to the means for receiving data representative of an external measurement from a second source to correlating a predetermined set of internal power detector values with corresponding external measurement from the second external source;
wherein the means for interpolating is responsive to the means for receiving data representative of an external measurement from a second source to interpolating a new power detector value for at least one operating point based on the set of internal power detector values, the operating point comprising a frequency and a desired output power; and
wherein the means for determining transmitter gain is responsive to achieving the new desired power detector value by performing a closed loop transmission.

16. A system according to claim 13, further comprising:
the means for interpolating a desired power detector value further comprises means for interpolating a desired power detector value for each supported frequency and each supported power level of the transmitter,
means for setting transmitter gain;
means for measuring the power detector value of a closed loop signal with a power detector; and
means for adjusting transmitter gain until the measured power detector value is at the desired power detector value;
wherein the setting transmitter gain, measuring the power detector value and adjusting transmitter gain is repeated for each frequency and power level supported by the transmitter that an interpolated desired power detector value was calculated.

17. A system as in claim 13, further comprising:

means for recording the frequency, power level, gain and one of the desired power detector level and the external power measurement for each supported frequency and power level of the transmitter; and means for generating power level tables based on the recorded frequency, power level, gain and one of the desired power detector level and the external power measurement; and means for storing the generated power level tables in a non-volatile memory accessible to the transmitter.

18. A wireless transceiver, comprising:

an adjustable gain transmitter;

a power coupler with a power detector coupled to the adjustable gain transmitter;

an automatic level controller coupled to the adjustable gain transmitter;

wherein the adjustable gain transmitter is suitably adapted to send a wireless signal to an external power detector coupled to an external host device that is also measured by a power detector coupled to the transceiver at the output of the power amplifier;

wherein the adjustable gain transmitter is suitably adapted to adjust transmitter gain until the power of the wireless signal measured by the external power detector is at a desired power level for a plurality of operating points, the operating points defined by frequency and power level; and wherein one of the group consisting of the automatic level controller and the external host device is configured to correlate the power of the wireless signal measured by the external power detector with the measurement made by the power detector at the output of the power amplifier as correlated power detector measurements and is further configured to interpolate a desired power detector value for an interpolated operating point based on the correlated power detector measurements.

19. A wireless transceiver according to claim 18, wherein the automatic level controller further comprises:

means for setting gain for the adjustable gain transmitter;

means for sending a closed loop wireless signal;

means for determining the power detector value for the closed loop wireless signal; and means for adjusting transmitter gain until the power detector value is at the desired power detector value.

20. A wireless transceiver according to claim 19, further comprising:

a non-volatile memory configured to store power level tables coupled to the automatic level controller;

the automatic level control further comprising means for storing gain, power detector value, frequency and power level for the interpolated operating point.

* * * * *